United States Patent
Kondo et al.

(10) Patent No.: US 7,734,310 B2
(45) Date of Patent: Jun. 8, 2010

(54) MOBILE TERMINAL DEVICE

(75) Inventors: Satoshi Kondo, Kyoto (JP); Takahiro Nishi, Nara (JP); Hisao Sasai, Osaka (JP); Toshiyasu Sugio, Osaka (JP); Tadamasa Toma, Osaka (JP)

(73) Assignee: Panasonic Corporation, Osaka (JP)

( * ) Notice: Subject to any disclaimer, the term of this patent is extended or adjusted under 35 U.S.C. 154(b) by 745 days.

(21) Appl. No.: 11/630,030

(22) PCT Filed: May 27, 2005

(86) PCT No.: PCT/JP2005/009781

§ 371 (c)(1),
(2), (4) Date: Dec. 19, 2006

(87) PCT Pub. No.: WO2006/006313

PCT Pub. Date: Jan. 19, 2006

(65) Prior Publication Data

US 2007/0249395 A1 Oct. 25, 2007

(30) Foreign Application Priority Data

Jul. 8, 2004 (JP) .............................. 2004-201376

(51) Int. Cl.
*H04M 1/00* (2006.01)
(52) U.S. Cl. .................................... 455/550.1; 455/574
(58) Field of Classification Search .............. 455/556.1, 455/3.01; 386/46, 68
See application file for complete search history.

(56) References Cited

U.S. PATENT DOCUMENTS 5,949,484 A 9/1999 Nakaya et al.

(Continued)

FOREIGN PATENT DOCUMENTS

EP 1 398 947 3/2004

(Continued)

OTHER PUBLICATIONS

Supplementary European Search Report issued Mar. 6, 2009 in EP 05 74 3667, which is a foreign counterpart to the present application.

(Continued)

*Primary Examiner*—Edward Urban
*Assistant Examiner*—Golam Sorowar
(74) *Attorney, Agent, or Firm*—Wenderoth, Lind & Ponack, L.L.P.

(57) ABSTRACT

To provide a mobile terminal device which enables a user to view the television broadcast while the television broadcast is being displayed or the television broadcast is start to be displayed even in the case where the remaining amount of battery is small, and which can perform an action which reflects the user's intention. The mobile terminal device (100) includes: a television broadcast receiving unit (101) which receives a television broadcast signal; a television broadcast processing unit (102) which decodes the stream of the received television broadcast signal; a display conversion unit (103) which converts the decoded YUV signal into an RGB signal on a frame-by-frame basis; a control unit (109) which controls actions of the mobile terminal device in the case where the remaining amount of a battery (112) falls to a predetermined amount or below while the video and audio of the television broadcast is being outputted or in the case where the remaining amount of the battery (112) is the predetermined amount or below at the time when the video and audio of the television broadcast are required to be outputted; and an electric power supply management unit (111) which detects remaining amounts of the battery (112) and notifies the control unit (109) of the remaining amounts of battery for every predetermined time points.

13 Claims, 5 Drawing Sheets

U.S. PATENT DOCUMENTS

| | | | |
|---|---|---|---|
| 6,697,953 B1* | 2/2004 | Collins | 713/320 |
| 2001/0029196 A1 | 10/2001 | Wakamatsu | |
| 2003/0123844 A1* | 7/2003 | Toma et al. | 386/46 |
| 2004/0052504 A1* | 3/2004 | Yamada et al. | 386/68 |
| 2007/0111657 A1* | 5/2007 | Yamada et al. | 455/3.01 |
| 2007/0249395 A1* | 10/2007 | Kondo et al. | 455/556.1 |

FOREIGN PATENT DOCUMENTS

| | | |
|---|---|---|
| JP | 2003-204493 | 7/2003 |
| JP | 2003-264767 | 9/2003 |
| JP | 2003-274313 | 9/2003 |
| JP | 2005-057475 | 3/2005 |
| JP | 2005-109616 | 4/2005 |
| WO | 03/058953 | 7/2003 |

OTHER PUBLICATIONS

English translation of paragraph Nos. [0012]-[0016] and Figs. 1-3 of JP 2003-204493, published Jul. 18, 2003.

* cited by examiner

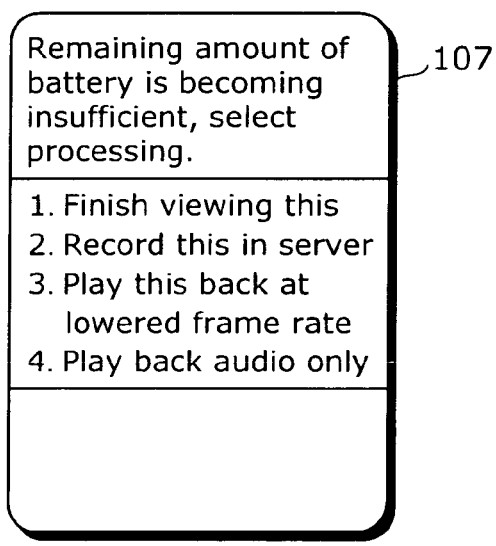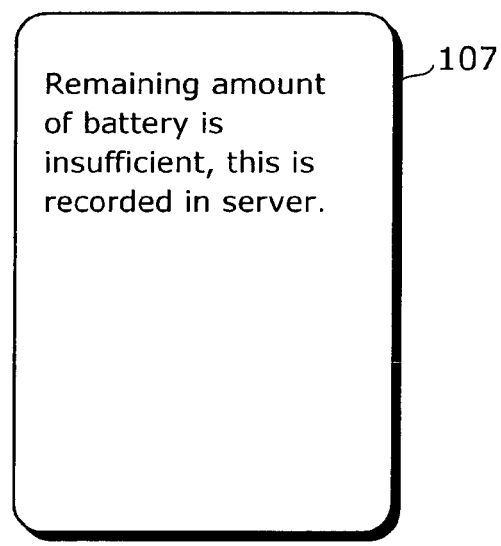
FIG. 4A
FIG. 4B

MOBILE TERMINAL DEVICE

TECHNICAL FIELD

The present invention relates to a mobile terminal device such as a mobile telephone and a mobile information terminal, and in particular to a mobile terminal device which receives and displays a television broadcast.

BACKGROUND ART

Recently, mobile terminal devices such as a mobile telephone and a mobile information terminal have increasingly become smaller and multifunctional, and some models of such devices which have appeared are capable of receiving and displaying a television broadcast. In addition, viewing devices have also increasingly become smaller and multifunctional, and some models of mobile viewing devices which have appeared allow viewing and recording a television broadcast simultaneously.

These mobile terminal devices and mobile viewing devices have a problem that they use batteries as electric power supply and thus they become incapable of displaying the television broadcast when the remaining amount of battery becomes insufficient.

Therefore, as a device such as that described above, there has been proposed a mobile viewing device which can output an instruction for reducing electric power to a back light running unit in an LCD panel when the remaining amount of battery falls to a certain level so as to avoid the abandonment of viewing the television broadcast due to the reduction in the remaining amount of battery (for example, refer to Patent Reference 1). This mobile viewing device is configured to stop applying electricity to a structural element for displaying video and to record the received video and audio on a memory card when the remaining amount of battery falls to a further lower level.

Patent Reference 1: Japanese Laid-Open Patent Application No. 2003-274313.

DISCLOSURE OF INVENTION

Problems that Invention is to Solve

However, a mobile viewing device as mentioned above has a problem that it becomes incapable of recording the received video and audio on a memory card in the case where the remaining amount of battery becomes still further insufficient because the video and audio are recorded in the memory card within the device.

In addition, a current mobile telephone with a function of receiving a television broadcast is configured to forcibly stop displaying the television broadcast when the remaining amount of battery falls to a certain level or below in order to secure a certain battery amount for telephone functions. Thus, there is a problem that the display of the television broadcast is stopped in the middle of the television program and the television program cannot be viewed to the end.

In addition, actions of a device in the case where the remaining amount of battery is insufficient while the television broadcast is being displayed and at the time when the television broadcast starts to be displayed are limited to predetermined actions, and thus it is impossible to reflect user's intention.

The present invention has been conceived in consideration of the above circumstances. An object of the present invention is to provide a mobile terminal device which enables a user to view the television broadcast even in the case where the remaining amount of battery is insufficient while the television broadcast is being displayed and at the time when the television broadcast starts to be displayed and which can perform an action which reflects the user's intention.

Means to Solve the Problems

In order to achieve the above object, the mobile terminal device of the present invention receives a signal of a television broadcast and displays the television broadcast. The device includes: a broadcast processing unit which processes the television broadcast; an electric power supply management unit which detects one of a remaining amount of battery running the mobile terminal device and a consumption amount of the battery; and a control unit which gives an instruction to a device other than the mobile terminal device to record the television broadcast, or to give an instruction to the broadcast processing unit to lower a display frame rate, depending on one of the remaining amount of battery and the consumption amount of battery.

This enables a user to view the television broadcast recorded by the device other than the mobile terminal device later on even when the display of the television broadcast is finished. In addition, this enables to reduce the amount of display conversion processing which involves display performed on a frame-by-frame basis and to control electric power consumption. The display conversion includes conversion from a YUV signal to an RGB signal.

In addition, the mobile terminal device may further include an operation reception unit which receives an operation from outside. The control unit in the mobile terminal device may make an inquiry as to whether or not the television broadcast should be recorded in the device other than the mobile terminal device before giving the recording instruction to the device other than the mobile terminal device, in one of the case where the remaining amount of battery is a predetermined amount or below and the case where the consumption amount of battery is a predetermined amount or above, and may control the recording instruction based on the operation from outside for making a response to the inquiry and being received by the operation reception unit.

This enables the user to select a desired action.

In addition, the control unit in the mobile terminal device may instruct the broadcast processing unit to stop outputting video of the television broadcast and to instruct the broadcast processing unit to continue to output audio of the television broadcast.

This enables control of electric power consumption because the decoding processing of a video stream in the broadcast processing unit and the display of the video stream on, for example, a liquid display panel which consumes a lot of electricity are stopped.

In addition, the mobile terminal device may further include an operation reception unit which receives an operation from outside. The control unit in the mobile terminal device may make an inquiry as to whether or not the display frame rate should be lowered before giving the lowering instruction to the broadcast processing unit, in one of the case where the remaining amount of battery is a predetermined amount or below and the case where the consumption amount of battery is a predetermined amount or above, and may control the lowering instruction based on the operation from outside for making a response to the inquiry and being received by the operation reception unit.

This enables a user to select a desired action.

In addition, the control unit in the mobile terminal device may determine the display frame rate depending on one of the remaining amount of battery and the consumption amount of battery.

This enables to further reduce the amount of processing for display conversion depending on the remaining or consumption amount of battery and to control the electric power consumption.

Note that the present invention can be realized not only as a mobile terminal device like this but also as a method including steps which correspond to the unique units provided with the mobile terminal device and also as a program causing a computer to execute these steps. Of course, the program can be distributed by means of a recording medium such as a CD-ROM and a communication medium such as the Internet.

Effects of the Invention

As clear from the above description, with the mobile terminal device of the present invention, it becomes possible to record a television broadcast using a device other than the mobile terminal device in the case where the remaining amount of battery is a predetermined amount or below, or in the case where the consumption amount of battery is the predetermined amount or above. This enables a user to view the television broadcast recorded by the device later on even in the case where the display of the television broadcast is finished.

In addition, it becomes possible to reduce the amount of display conversion processing which involves the display performed on a frame-by-frame basis because the display frame rate can be lowered in the case where the remaining amount of battery is a predetermined amount or below, or in the case where the consumption amount of battery is a predetermined amount or above. This makes it possible to control the electric power consumption.

Consequently, the present invention is highly practical today when mobile terminal devices which display a television broadcast are becoming widespread.

BRIEF DESCRIPTION OF DRAWINGS

FIGS. 4A and 4B each is a diagram showing a display example on the display. FIG. 4A is a diagram showing a display example of an inquiry message and the response choices, and FIG. 4B is a diagram showing a display example of a notification message.

NUMERICAL REFERENCES

Figure 1:
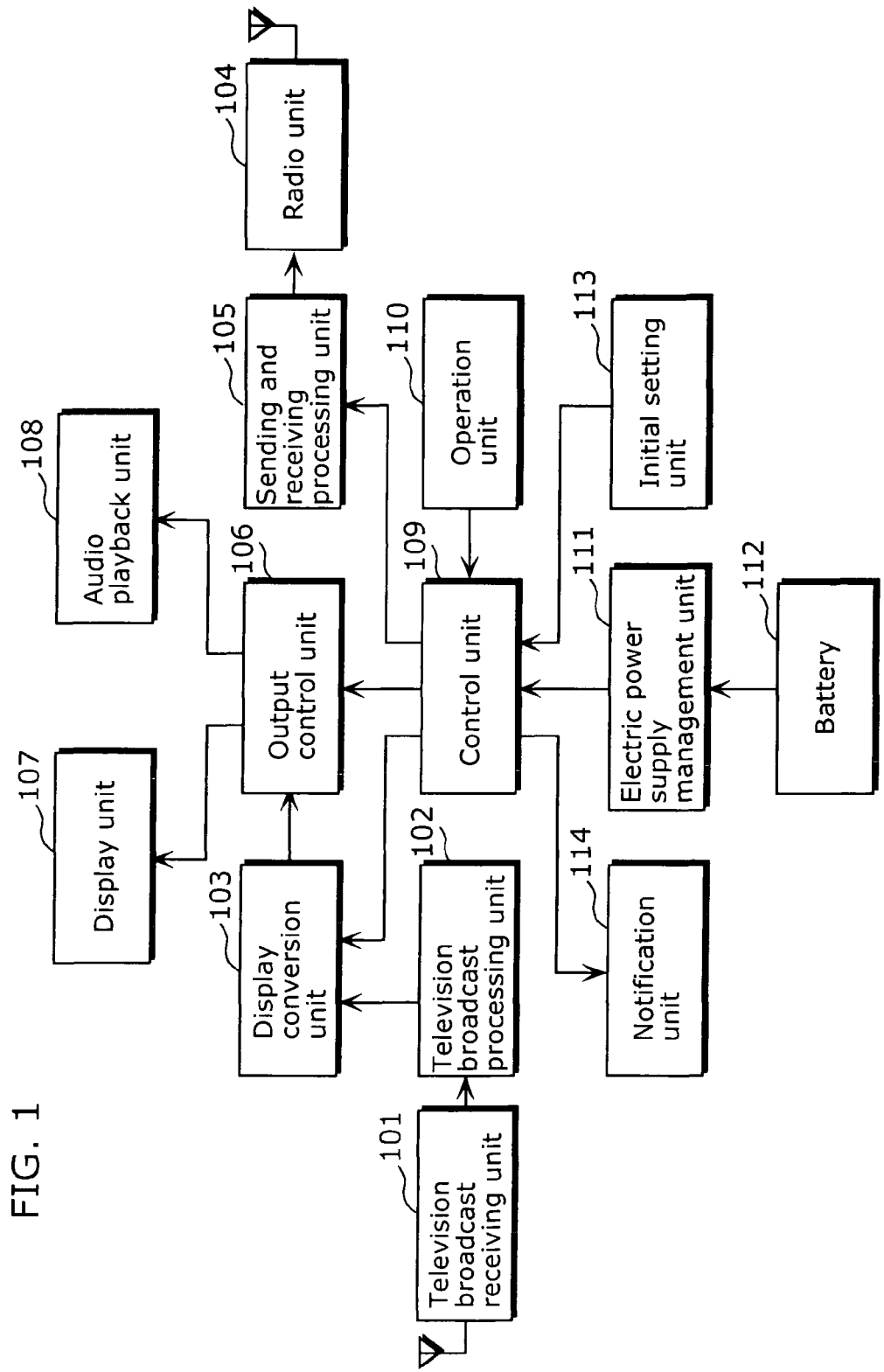
FIG. 1 is a block diagram showing the configuration of a mobile terminal device of an embodiment in the present invention.

100 Mobile terminal device
101 Television broadcast receiving unit
102 Television broadcast processing unit
103 Display conversion unit
104 Radio unit
105 Sending and receiving processing unit
106 Output control unit
107 Display unit
108 Audio playback unit
109 Control unit
110 Operation unit
111 Electric power supply management unit
112 Battery
113 Initial setting unit
114 Notification unit

BEST MODE FOR CARRYING OUT THE INVENTION

An embodiment of the present invention will be described with reference to the drawings.

FIG. 1 is a block diagram showing the configuration of the mobile terminal device of the embodiment in the present invention.

The mobile terminal device 100 such as a mobile telephone is for receiving a television broadcast and displays the received television broadcast, making a phone call, and sending and receiving e-mail. As shown in FIG. 1, the mobile terminal device 100 includes: a television broadcast receiving unit 101, a television broadcast processing unit 102, a display conversion unit 103, a radio unit 104, a sending and receiving processing unit 105, an output control unit 106, a display unit 107, an audio playback unit 108, a control unit 109, an operation unit 110, an electric power supply management unit 111, a battery 112, an initial setting unit 113, and a notification unit 114.

The television broadcast receiving unit 101 receives a television broadcast signal which is broadcast in a stream by a television broadcasting station. The stream is, for example, a Moving Picture Experts Group (MPEG) 2 transport stream. The television broadcast processing unit 102 decodes the stream received by the television broadcast receiving unit 101, outputs the video of the television broadcast to the display conversion unit 103, and outputs the audio of the television broadcast to the output control unit 106. The display conversion unit 103 converts, on a frame-by-frame basis, the luminance signal and the chrominance signals (YUV signal) decoded by the television broadcast processing unit 102 into an RGB signal with a form which can be displayed on the display unit 107.

The radio unit 104 performs radio communication with the base station. The sending and receiving processing unit 105 performs a packetization processing of received data or data to be sent. The output control unit 106 performs control in the case of outputting video and audio of the inputted television broadcast, e-mail, telephone speech, images and speech through a video telephone or the like to the display unit 107 and the audio playback unit 108. The display unit 107 displays video of the television broadcast, e-mail, images through such video telephone or the like. The audio playback unit 108 plays back the audio of the television broadcast, speech through a telephone, speech through a video telephone or the like.

The control unit 109 controls an action available in the case where the remaining amount of the battery 112 falls to a predetermined amount or below while the video and audio of the television broadcast are being outputted or in the case where the remaining amount of the battery 112 is a predetermined amount or below at the time when the video and audio of the television broadcast are required to be outputted. The operation unit 110 has operation keys for enabling a user to perform operation. The operation keys include a numeric keypad and cursor keys. The electric power supply management unit 111 detects remaining amounts of the battery 112, and notifies the control unit 109 of the detected remaining amounts of battery at predetermined time points (for example, at every one minute). The initial setting unit 113 holds the initial settings which have been previously set by the user. The notification unit 114 notifies the user of reception or the like of a telephone call or e-mail by means of a vibrator, sound, light emission, display or the like.

Figure 2:
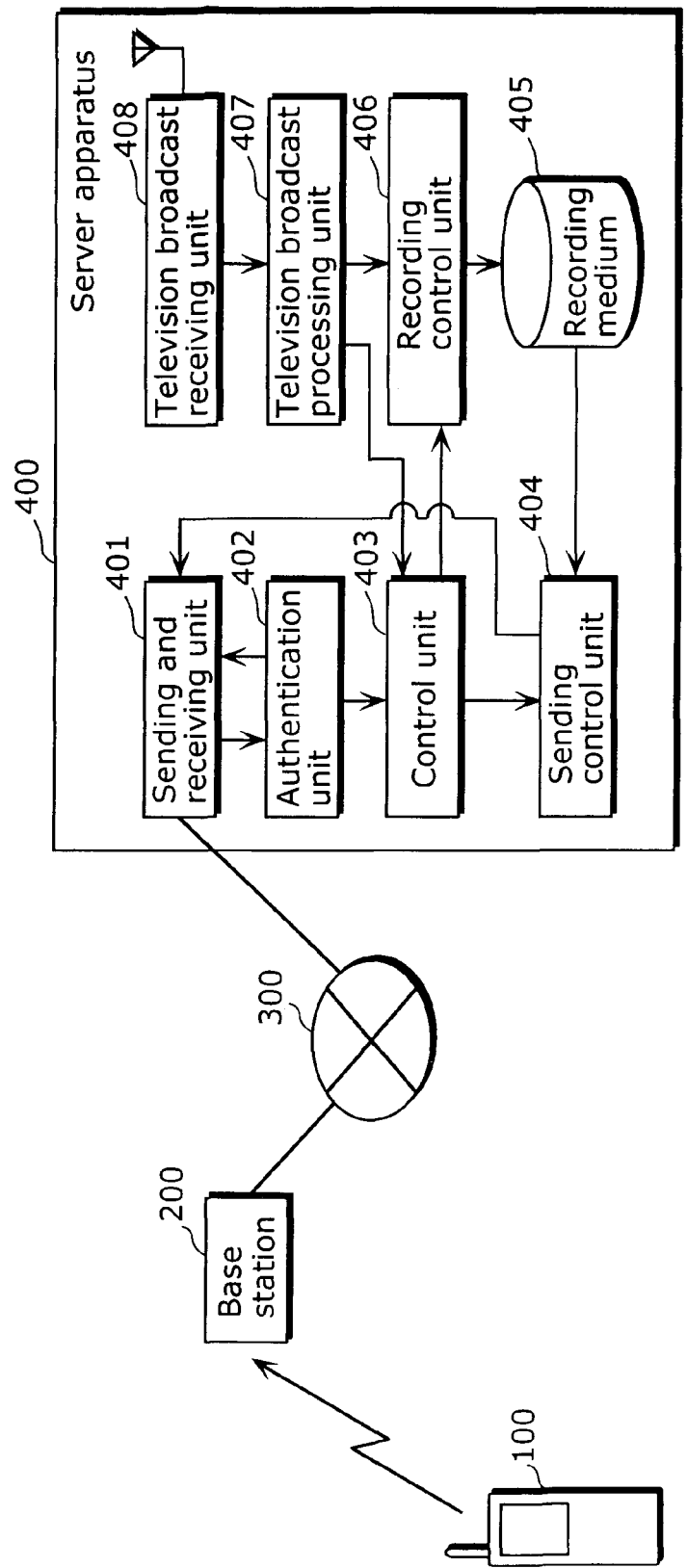
FIG. 2 is a block diagram showing the configuration of the system in which the mobile terminal device of the embodiment in the present invention is used.

FIG. 2 is a block diagram showing the configuration of the system in which the mobile terminal device of the embodiment in the present invention is used.

The system in which the mobile terminal device 100 configured as described above is used is for sending and receiving telephone calls and e-mail, and includes a base station 200, a network 300 such as the Internet, and a server device 400.

The server device 400 is for recording a television broadcast program according to a recording instruction by the mobile terminal device 100. As shown in FIG. 2, it includes: a sending and receiving unit 401, an authentication unit 402, a control unit 403, a sending control unit 404, a recording medium 405, a recording control unit 406, a television broadcast processing unit 407, and a television broadcast receiving unit 408.

The television broadcast receiving unit 408 receives a television broadcast signal which is broadcast from a broadcasting station in a stream such as an MPEG-2 transport stream. The television broadcast processing unit 407 extracts auxiliary information such as an electric program guide (EPG) from the stream received by the television broadcast receiving unit 408, and outputs it to the control unit 403.

The sending and receiving unit 401 sends and receives the data and performs packetization processing of the data. The authentication unit 402 performs authentication as to whether or not the mobile terminal device 100 which sent the recording instruction of the television broadcast program belongs to a previously registered user. The control unit 403 controls the start and end of recording of the television broadcast program based on the recording instruction from the mobile terminal device 100 and the auxiliary information. In addition, the control unit 403 controls sending of the television broadcast program recorded in the recording medium 405 based on a request from the mobile terminal device 100.

The sending control unit 404 reads out the stream of the television broadcast program recorded in the recording medium 405, and sends it to the mobile terminal device 100 through the sending and receiving unit 401. The recording medium 405 is a recording unit such as a hard disc in which a television broadcast program is recorded. The recording control unit 406 records the received television broadcast program on the recording medium 405.

Next, the action of the mobile terminal device 100 in the case where video and audio of the television broadcast (which is simply called display of the television broadcast hereinafter) is outputted in the mobile terminal device 100 configured as described above.

First, the stream received by the television broadcast receiving unit 101 is inputted to the television broadcast processing unit 102. The television broadcast processing unit 102 decodes the inputted stream and outputs the video YUV signal of the decoded television broadcast on the display conversion unit 103 at a normal display frame rate (for example 15 frames per second). In addition, the television broadcast processing unit 102 outputs the audio of the decoded television broadcast to the output control unit 106. The display conversion unit 103 converts the inputted YUV signal into an RGB signal on a frame-by-frame basis, and outputs it to the output control unit 106. The output control unit 106 outputs the inputted video RGB signal of the television broadcast to the display unit 107, and outputs the inputted audio of the television broadcast to the audio playback unit 108. In this way, the mobile terminal device 100 displays the television broadcast.

An action of the mobile terminal device 100 in the following cases will be described next: the case where the remaining amount of battery falls to a predetermined amount or below while the television broadcast is being displayed in the mobile terminal device 100; and the case where the remaining amount of battery is a predetermined amount or below at the time when the television broadcast is required to be displayed.

Figure 3:
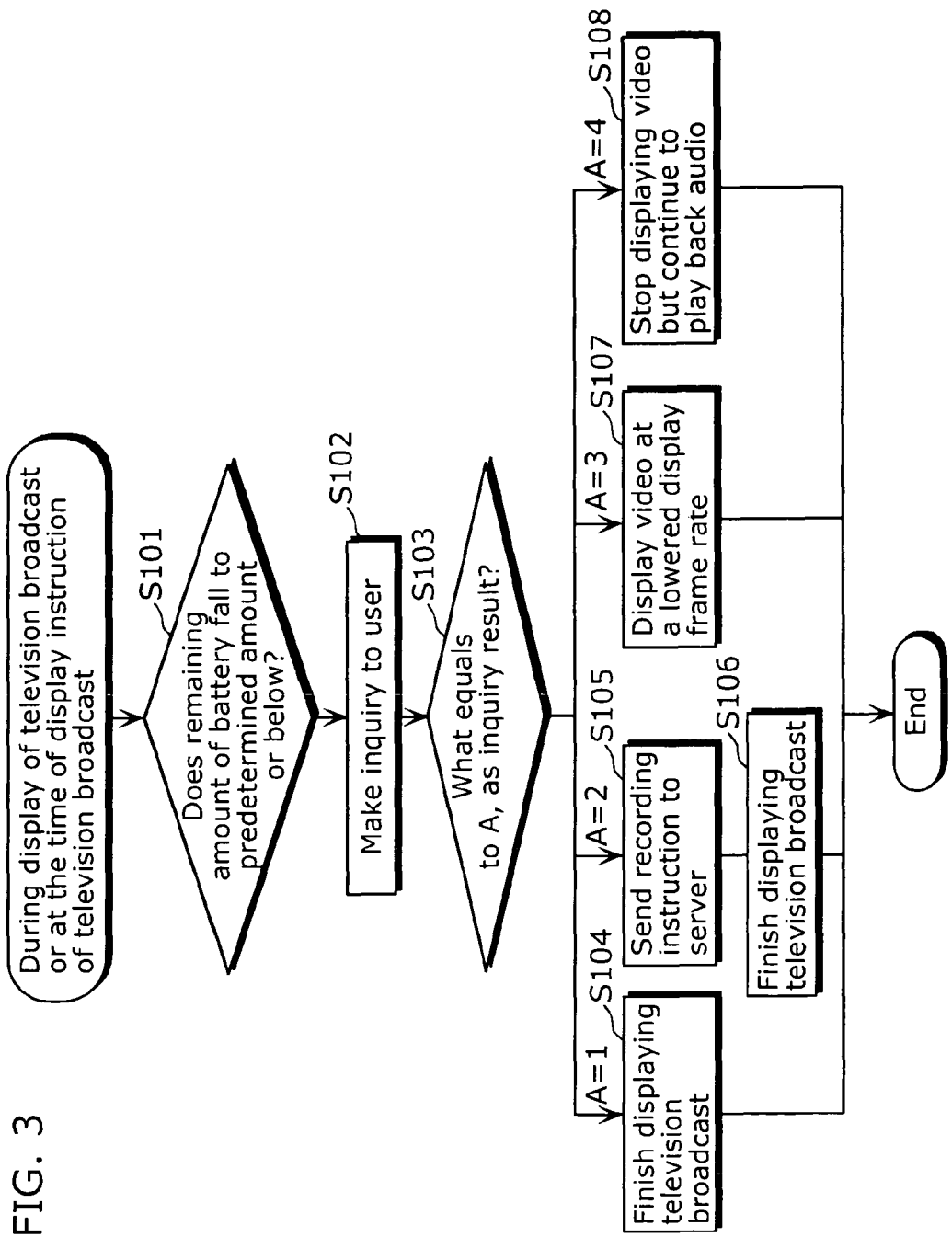
FIG. 3 is a flow chart showing the operation flow in the case where the remaining amount of battery falls to a predetermined amount or below while the television broadcast is being displayed or in the case where the remaining amount of battery is a predetermined amount or below at the time when the television broadcast is required to be displayed.

FIG. 3 is a flow chart showing the operation flow in the case where the remaining amount of battery falls to a predetermined amount or below while the television broadcast is being displayed, or in the case where the remaining amount of battery is a predetermined amount or below at the time when the television broadcast is required to be displayed.

The control unit 109 judges whether or not the remaining amount of the battery 112 which has been notified by the electric power supply management unit 111 is a predetermined amount or below (Step S101). Here, in the case where the remaining amount of battery is more than a predetermined amount (Step S101: YES), the control unit 109 starts displaying the television broadcast at a normal display frame rate. In the other case where the action at the time when the display of the television broadcast is required starts the display of the television broadcast at a normal display frame rate (not shown).

On the other hand, in the case where the remaining amount of battery is a predetermined amount or below (Step S101: NO), since the remaining amount of battery is a predetermined amount or below, the control unit 109 instructs the output control unit 106 to display, on a predetermined area of the display unit 107, an inquiry as to the handling of the display of the television broadcast. The output control unit 106 which received this instruction displays, for example, the followings shown in FIG. 4A on the predetermined area of the display unit 107: a message such as "Remaining amount of battery is becoming insufficient, select processing.", and response choices of "1. Finish viewing this", "2. Record this in server", "3. Play this back at lowered frame rate", "4. Play back audio only" and the like (Step S102).

In the case where "1. Finish viewing this" is selected by the user as a response to the inquiry (Step S103: A=1), the control unit 109 instructs the television broadcast receiving unit 101 and the output control unit 106 to finish displaying the television broadcast. The television broadcast receiving unit 101 which received this instruction finishes receiving the television broadcast. In addition, the output control unit 106 deletes the message displayed on the display unit 107 and finishes outputting the video and audio of the television broadcast (Step S104).

In addition, in the case where "2. Record this in server" is selected by the user as a response to the inquiry (Step S103: A=2), the control unit 109 instructs the server device to record the television broadcast program which is now being displayed. In other words, the control unit 109 sends the recording instruction specifying the broadcasting station (channel) of the television broadcast program which is now being displayed through the sending and receiving processing unit 105 and the radio unit 104 (Step S105). In addition, the control unit 109 instructs the television broadcast receiving unit 101 and the output control unit 106 to finish the display of the television broadcast. The television broadcast receiving unit 101 which received this instruction finishes receiving the television broadcast. In addition, the output control unit 106 deletes the message displayed on the display unit 107 and finishes the display of the television broadcast (Step S106).

Figure 5:
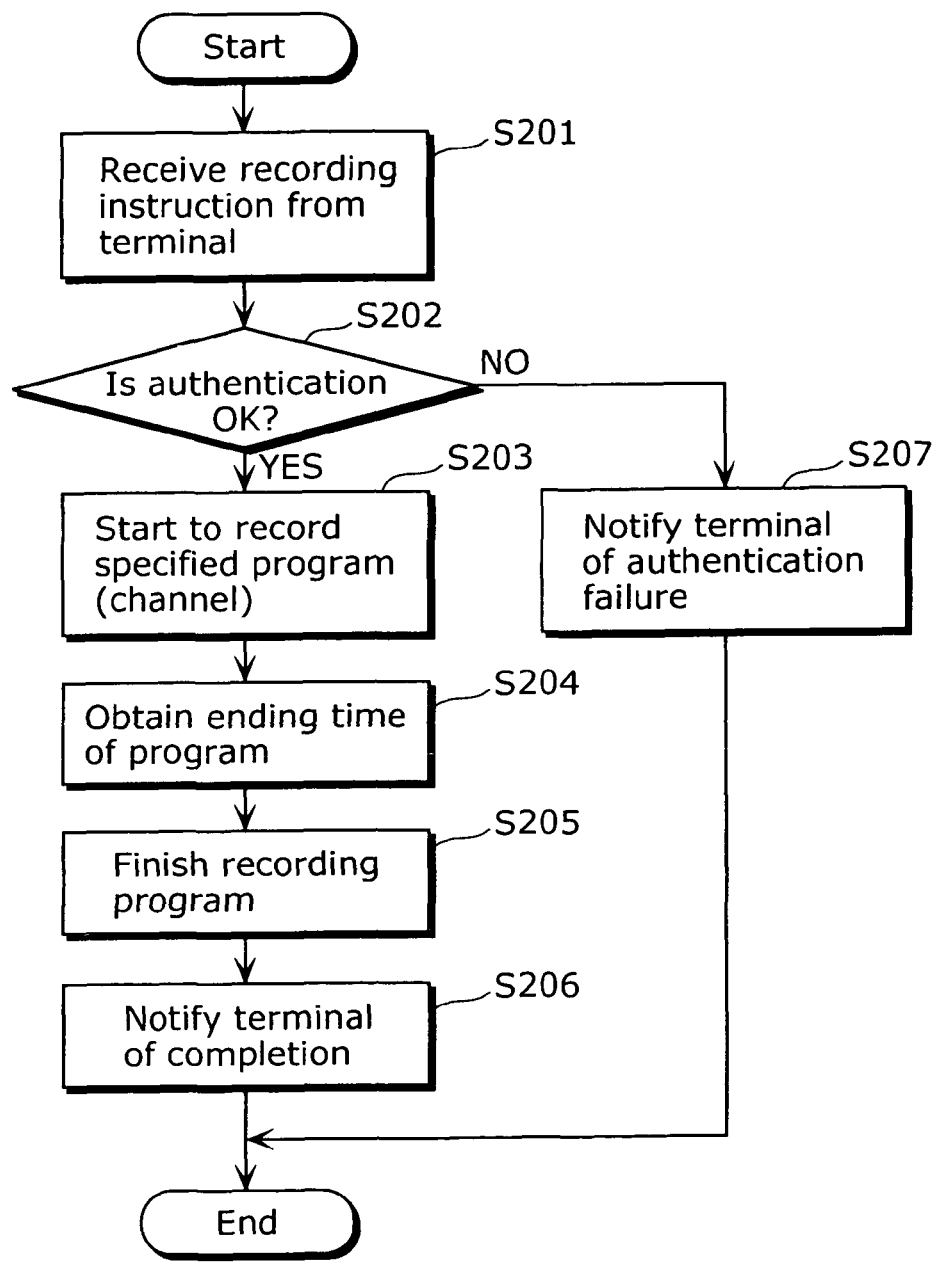
FIG. 5 is a flow chart showing the operation flow in the case of causing a server device to record the television broadcast which has been specified to be recorded.

FIG. 5 is a flow chart showing the operation flow in the case of causing a server device 400 to record the television broadcast which has been specified to be recorded.

When the server device 400 receives the recording instruction from the mobile terminal device 100 by using the sending and receiving unit 401 (Step S201), the authentication unit 402 performs authentication as to whether the mobile terminal device 100 which sent the recording instruction belongs to a previously registered user or not using, for example, the user ID and the like included in the recording instruction (Step S202). In the case where it is authenticated that the mobile terminal device 100 which sent the recording device belongs to a previously recorded user, as the result of this authentication (Step S202: YES), the control unit 403 instructs the recording control unit 406 to start recording a program of the broadcasting station specified by the recording instruction. The recording control unit 406 which received this instruction records the stream received by the television broadcast receiving unit 407 in a recording medium 405 (Step S203).

In addition, the control unit 403 obtains the ending time of the program of the broadcasting station specified by the recording instruction by referring to the auxiliary information such as an electronic program guide (EPG) extracted by the television broadcast processing unit 408 (Step S204) at this time. Next, the control unit 403 specifies the recording control unit 406 to finish recording the program which is being recorded, at the ending time of the program which is being recorded. The recording control unit 406 which received this instruction finishes recording the program which is being recorded into the recording medium 405 (Step S205). Next, the control unit 403 notifies the mobile terminal device 100 that the recording of the program of the broadcasting station specified by the recording instruction has been completed (Step S206).

In addition, as the result of the above authentication (Step S202), the mobile terminal device 100 which sent the recording instruction is not authenticated as belonging to a previously registered user (Step 202: NO), the control unit 403 notifies the mobile terminal device 100 which sent the recording instruction that the mobile terminal device 100 is not authenticated as belonging to a user (Step S207).

On the other hand, in the case where the mobile terminal device 100 receives a notification indicating that the mobile terminal device 100 has not been authenticated as belonging to a user or a notification indicating that the recording of the specified program has been completed, it instructs the output control unit 106 to display as such. The output control unit 106 which received this instruction displays, on the display unit 107, a message of "User has not been authenticated." or "Television broadcast program specified to be recorded has been recorded in server device."

In addition, in the case where "3. Play this back at lowered frame rate" is selected by the user as a response to the inquiry (Step S103: A=3), the control unit 109 instructs the television broadcast processing unit 102 to lower the video of the television broadcast which is now being displayed at a display frame rate (for example, 15 frames per second) to a predetermined display frame rate (for example, 7.5 frames per second which is one-seconds of the normal display frame rate). The television broadcast processing unit 102 which received this instruction outputs the video to the display conversion unit 103 by lowering the decoded normal display frame rate to the predetermined display frame rate. The display conversion unit 103 converts the inputted YUV signal whose frame rate has been lowered to a predetermined frame rate into an RGB signal on a frame-by-frame basis, and outputs it to the output control unit 106. The output control unit 106 deletes the message displayed on the display unit 107, and displays the television broadcast video at the lowered display frame rate on the display unit 107 (Step S107). Note that the television broadcast processing unit 102 may lower the display frame rate by decoding only some of the pictures, for example, I pictures only, I pictures and P pictures only.

In addition, in the case where "4. Play back audio only" is selected by the user as a result of the inquiry (Step S103: A=4), the control unit 109 instructs the television broadcast processing unit 102 and the output control unit 106 to stop displaying the video of the television broadcast which is being displayed. The television broadcast processing unit 102 which received this instruction stops decoding the video stream within the stream received by the television broadcast receiving unit 101. In addition, the output control unit 106 stops displaying the video of the television broadcast by deleting the message displayed on the display unit 107 (Step S108). At this time, the television broadcast processing unit 102 continues to decode the audio stream within the stream received by the television broadcast receiving unit 101, and continues to play back the audio of the television broadcast in the audio playback unit 108.

As described up to this point, the user is asked about a future action to be performed in the case where the remaining amount of battery falls to a predetermined amount or below while the television broadcast is being displayed or in the case where the remaining amount of battery is a predetermined amount or below at the time when the television broadcast is required to be displayed. Therefore, the user can select a desired action.

In addition, in the case where "2. Record this in server" is selected, since the television broadcast program which has been displayed so far is recorded in the server device 400, electric power is not consumed for the display of the television broadcast. This enables the user to view the recorded program later on. In addition, the program can surely be recorded in the server device 400.

In addition, in the case where "3. Play this back at lowered frame rate" is selected, it is possible to reduce the amount of processing for display conversion from a YUV signal to an RGB signal in the display conversion unit 103, and to control the consumption of electric power.

In addition, in the case where "4. Play back audio only" is selected, the process of decoding video stream in the television broadcast processing unit 102 and the display on the display unit 107 which consumes a lot of electricity are stopped. Thus, it is possible to control consumption of electric power.

In this embodiment, the user is asked about a future action to be performed in the case where the remaining amount of battery falls to a predetermined amount or below while the television broadcast is being displayed or in the case where the remaining amount of battery is a predetermined amount or below at the time when the television broadcast is required to be displayed, it should be noted that such inquiry is not always required. It is possible to previously set which action is taken, among these actions described above, in the initial setting unit 113. Subsequently, the control unit 109 may control the action performed in the case where the remaining amount of battery falls to a predetermined amount or below while the television broadcast is being displayed or in the case where the remaining amount of battery is a predetermined amount at the time when the television broadcast is required to be displayed, based on the details which have been set in the initial setting unit 113.

In an example case where "2. Record this in server" is set in the initial setting unit 113, the control unit 109 is to display a message such as "Remaining amount of battery is insufficient, this is recorded in server." on the display unit 107 as shown in FIG. 4B without making any inquiry to the user, and to send the recording instruction to the server device 400.

In an additional example case where "3. Play this back at lowered frame rate" is set in the initial setting unit 113, the control unit 109 displays a message such as "Remaining amount of battery is insufficient, this is played back at lowered frame rate." on the display unit 107 without making any inquiry to the user, and to display the video of the television broadcast at the lowered display frame rate on the display unit 107.

In addition, in another example case where "1. Finish viewing this" is set in the initial setting unit 113, the control unit 109 displays a message such as "Remaining amount of battery is insufficient, display of the television broadcast is finished." on the display unit 107 without making any inquiry to the user, and to stop displaying the television broadcast on the display unit 107. In this case, for example, the notification unit 114 may notify the user of the end of the television broadcast, using a vibrator, sound, light emission or the like, without displaying the message on the display unit 107.

In addition, in another example case where "4. Play back audio only" is set in the initial setting unit 113, the control unit 109 displays a message of "Remaining amount of battery is insufficient, the display of the video is stopped and only audio is played back." or the like on the display unit 107, without making any inquiry to the user, and stops displaying it on the display unit 107. Also in this case, for example, the notification unit 114 may notify the user of the stoppage of the display by a vibrator, sound, light emission or the like, without displaying any message on the display unit 107.

In addition, in this embodiment, the user is asked about as to which method among these four methods should be selected regarding the future action to be performed in the case where the remaining amount of battery falls to a predetermined amount or below while the television broadcast is being displayed or in the case where the remaining amount of battery is a predetermined amount or below at the time when the television broadcast is required to be displayed. However, it is possible to select some of these four in combination instead of selecting only one. For example, in the case where "2. Record this in server" and "3. Play this back at lowered frame rate" are selected, the control unit 109 instructs the server device to record the television broadcast program which is now being displayed, and instructs the server device to display the television broadcast which is being displayed by lowering the display frame rate of the video to a predetermined display frame rate. This enables the user to continue to view the program which is being broadcast with the mobile terminal device until the battery is used up, while the television broadcast program which is now being displayed is recorded in the server device. The same effect can be obtained even in the case where "2. Record this in server" and "Play back audio only" are selected. Additionally, this is true of the case where "2. Record this in server" and "Play back audio only" are previously set in the initial setting unit 113.

In addition, the description of the embodiment has been provided assuming that the server device 400 is present in the network, however, the server device 400 may be present in the user's home or the like. In this case, the server device 400 can be realized as a home gateway, an HDD recorder or the like. Additionally, with the mobile terminal device 100 having an interface such as a memory card, it becomes possible to directly copy and paste or move the recorded program from an HDD recorder or the like to the memory card, and to play back the program in the memory card.

In addition, it is assumed that the server device 400 obtains the ending time of the program which is being recorded in this embodiment, but it is not limited to this. For example, the ending time may be included in the recording instruction from the mobile terminal device 100 and be sent.

In addition, in the case of playback at a lowered frame rate, the frame rate is lowered to a predetermined display frame rate in this embodiment. However, the frame rate is not limited to this. For example, it is possible that the control unit 109 has plural thresholds regarding remaining amounts of battery, the frame rate is lowered to a predetermined display frame rate (for example, 7.5 frames per second which is one-seconds of the normal display frame rate) first, and then the display frame rate is gradually lowered (for example, to 5 frames per second which is one-thirds of the normal display frame rate, and to 3 frames per second which is one-fifths of the normal display frame rate) depending on a remaining amount of the battery.

In addition, actions of the mobile terminal device 100 in the case where the electric power supply management unit 111 detects remaining amounts of the battery 112 and, for example, a remaining amount of battery falls to a predetermined amount or below while the television broadcast is being displayed have been described in this embodiment. However, such inquiry is not always required. For example, the electric power supply management unit 111 may detect consumptions of electric power of the battery 112 instead of remaining amounts of the battery 112, and for example, these actions may be performed in the case where a consumption of electric power amounts to a predetermined amount or above while the television broadcast is being displayed.

In addition, an example of the television broadcast in a stream such as an MPEG-2 transport stream has been described in this embodiment. However, the television broadcast receiving units 101 and 408 and the television broadcast processing units 102 and 407 may receive and play back analog broadcast.

In addition, actions, which are available in the case where the electric power supply management unit 111 detects the remaining amounts of the battery 112 and a remaining amount of battery falls to a predetermined amount or below while the television broadcast is being displayed, have been described in this embodiment. However, in the case where an outside electric power supply is supplied even in the case where the remaining amount of battery is the predetermined amount or below, the same actions as performed in the case where the remaining amount of battery is the predetermined amount or above may be performed.

In addition, the functional blocks of the block diagram shown in FIG. 1 are typically achieved in the form of an integrated circuit or a Large Scale Integrated (LSI) circuit. Each of these parts can be in plural single-function LSIs, or also can be in one integrated LSI (For example, the respective blocks other than the memory may be integrated into a single chip.). The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing an LSI or a reconfigurable processor that allows reconfiguration of the connection or configuration of the LSI can be used for the same purpose.

In the future, with a brand-new technology for forming an integrated circuit which replaces an LSI according to another technique developed or derived from a semiconductor technique, functional blocks may be integrated using that technology. Adaptation of biotechnology is one of such possibility.

Additionally, the center parts of the respective functional blocks of the block diagram shown in FIG. 1 and the flow chart shown in FIG. 3 are realized by the processor and the program.

INDUSTRIAL APPLICABILITY

As described up to this point, the mobile terminal device of the present invention is suitable for a mobile terminal device which can receive and display the television broadcast. For example, the mobile terminal device is suitable for a mobile telephone with a television, a Personal Digital Assistant (PDA) with a television and the like.

The invention claimed is:

1. A mobile terminal device which receives a signal of a television broadcast and displays the television broadcast, said mobile terminal device comprising:
   a broadcast processing unit operable to process the television broadcast;
   an electric power supply management unit operable to detect one of a remaining amount of a battery and a consumption amount of the battery, the battery running said mobile terminal device; and
   a control unit operable to give one of (i) a recording instruction to a device other than said mobile terminal device to record the television broadcast, and (ii) a lowering instruction to said broadcast processing unit to lower a display frame rate, depending on one of the remaining amount of the battery and the consumption amount of the battery,
   wherein said broadcast processing unit is further operable to decode all frames at a normal display frame rate, and lower the normal display frame rate used in the decoding to a predetermined display frame rate, when said broadcast processing unit receives, from said control unit, the lowering instruction to lower the normal display frame rate,
   said broadcast processing unit is operable to instruct the device other than said mobile terminal device to record the television broadcast when said broadcast processing unit receives, from said control unit, the recording instruction to record the television broadcast, and
   the control unit is operable to cause said mobile terminal device to display a message that the device other than said mobile terminal device has recorded a program in the television broadcast, when said control unit receives a notification indicating the completion of recording the program from the device other than said mobile terminal device.

2. The mobile terminal device according to claim 1, said mobile terminal device further comprising
   an operation reception unit operable to receive an operation from outside,
   wherein said control unit is operable to make an inquiry as to whether or not the television broadcast should be recorded in the device other than said mobile terminal device before giving the recording instruction to the device other than said mobile terminal device, in one of the case where the remaining amount of the battery is a predetermined amount or below and the case where the consumption amount of the battery is a predetermined amount or above, and
   said control unit is operable to control the recording instruction based on the operation from outside, the operation being for making a response to the inquiry and being received by said operation reception unit.

3. The mobile terminal device according to claim 2, said mobile terminal device further comprising an initial setting holding unit operable to hold, as an initial setting, an action to be performed in one of the case where the remaining amount of battery is a predetermined amount or below and the case where the consumption amount of battery is a predetermined amount or above,
   wherein said control unit is operable to control the holding instruction based on the initial setting held in said initial setting holding unit, in one of the case where the remaining amount of battery is a predetermined amount or below and the case where the consumption amount of battery is a predetermined amount or above.

4. The mobile terminal device according to claim 1, said mobile terminal device further comprising an initial setting holding unit operable to hold, as an initial setting, an action to be performed in one of the case where the remaining amount of battery is a predetermined amount or below and the case where the consumption amount of battery is a predetermined amount or above,
   wherein said control unit is operable to control the recording instruction based on the initial setting held in said initial setting holding unit, in one of the case where the remaining amount of battery is a predetermined amount or below and the case where the consumption amount of battery is a predetermined amount or above.

5. The mobile terminal device according to claim 1,
   wherein said control unit is operable to cause said mobile terminal device to display a message that the device other than said mobile terminal device records the television broadcast.

6. The mobile terminal device according to claim 1, wherein said control unit is operable to instruct said broadcast processing unit to stop outputting video of the television broadcast and to instruct said broadcast processing unit to continue to output audio of the television broadcast.

7. The mobile terminal device according to claim 1, said mobile terminal device further comprising an operation reception unit operable to receive an operation from outside,
   wherein said control unit is operable to make an inquiry as to whether or not the display frame rate should be lowered before giving the lowering instruction to said broadcast processing unit, in one of the case where the remaining amount of the battery is a predetermined amount or below and the case where the consumption amount of the battery is a predetermined amount or above, and
   said control unit is operable to control the lowering instruction based on the operation from outside, the operation being for making a response to the inquiry and being received by said operation reception unit.

8. The mobile terminal device according to claim 1, said mobile terminal device further comprising an initial setting holding unit operable to hold, as an initial setting, an action to be performed in one of the case where the remaining amount of the battery is a predetermined amount or below and the case where the consumption amount of the battery is a predetermined amount or above, wherein said control unit is operable to control the lowering instruction based on the initial setting held in said initial setting holding unit, in one of the case where the remaining amount of the battery is a predetermined amount or below and the case where the consumption amount of the battery is a predetermined amount or above.

9. The mobile terminal device according to claim 1, wherein said control unit is operable to determine the display frame rate depending on one of the remaining amount of the battery and the consumption amount of the battery.

10. The mobile terminal device according to claim 1, wherein said control unit is operable to cause said mobile terminal device to display a message that video of the television broadcast having the lowered display frame rate is reproduced.

11. The mobile terminal device according to claim 1, further comprising a display conversion unit operable to convert a YUV signal into an RGB signal on a per frame basis,
wherein said broadcast processing unit is operable to output, to said display conversion unit, frames having the predetermined display frame rate lowered from the normal display frame rate used in the decoding when said broadcast processing unit receives the lowering instruction from said control unit, and
said display conversion unit is operable to covert the YUV signal having the predetermined display frame rate into the RGB signal on a per frame basis.

12. A control method for a mobile terminal device which receives a signal of a television broadcast and displays the television broadcast, said method comprising:
processing the television broadcast;
detecting one of a remaining amount of a battery and a consumption amount of the battery, the battery running the mobile terminal device;
giving one of (i) a recording instruction to a device other than the mobile terminal device to record the television broadcast, and (ii) a lowering instruction that a display frame rate is lowered in said processing, depending on one of the remaining amount of the battery and the consumption amount of the battery, wherein
when the lowering instruction is given,
decoding all frames at a normal display frame rate, and lowering the normal display frame rate used in said decoding to a predetermined display frame rate when the lowering instruction o lower the normal display frame rate is received, and
when the recording instruction is given,
instructing the device other than the mobile terminal device to record the television broadcast,
receiving, by the mobile terminal device, a notification indicating a completion of recording the television broadcast from the device other than the mobile terminal device, and
displaying, by the mobile terminal device, a message that a program in the television broadcast has been recorded in said device other than said mobile terminal device, when the notification indicating the completion of recording the program is received.

13. An integrated circuit for controlling a mobile terminal device which receives a signal of a television broadcast and displays the television broadcast, said circuit comprising:
a broadcast processing unit operable to process the television broadcast;
an electric power supply management unit operable to detect one of a remaining amount of a battery and a consumption amount of the battery, the battery running said mobile terminal device; and
a control unit operable to give one of (i) a recording instruction to a device other than said mobile terminal device to record the television broadcast, and (ii) a lowering instruction to said broadcast processing unit to lower a display frame rate, depending on one of the remaining amount of the battery and the consumption amount of the battery,
wherein said broadcast processing unit is operable to decode all frames at a normal display frame rate, and lower the normal display frame rate used in the decoding to a predetermined display frame rate, when said broadcast processing unit receives, from said control unit, the lowering instruction to lower the normal display frame rate,
said broadcast processing unit is further operable to instruct the device other than said mobile terminal device to record the television broadcast when said broadcast processing unit receives, from said control unit, the recording instruction to record the television broadcast, and
the control unit is operable to cause said mobile terminal device to display a message that the device other than said mobile terminal device has recorded a program in the television broadcast, when said control unit receives a notification indicating the completion of recording the program from the device other than said mobile terminal device.

* * * * *